T. W. GRAHAM.
FRICTION DRIVE.
APPLICATION FILED AUG. 7, 1916.
1,271,158.
Patented July 2, 1918.
3 SHEETS—SHEET 1.
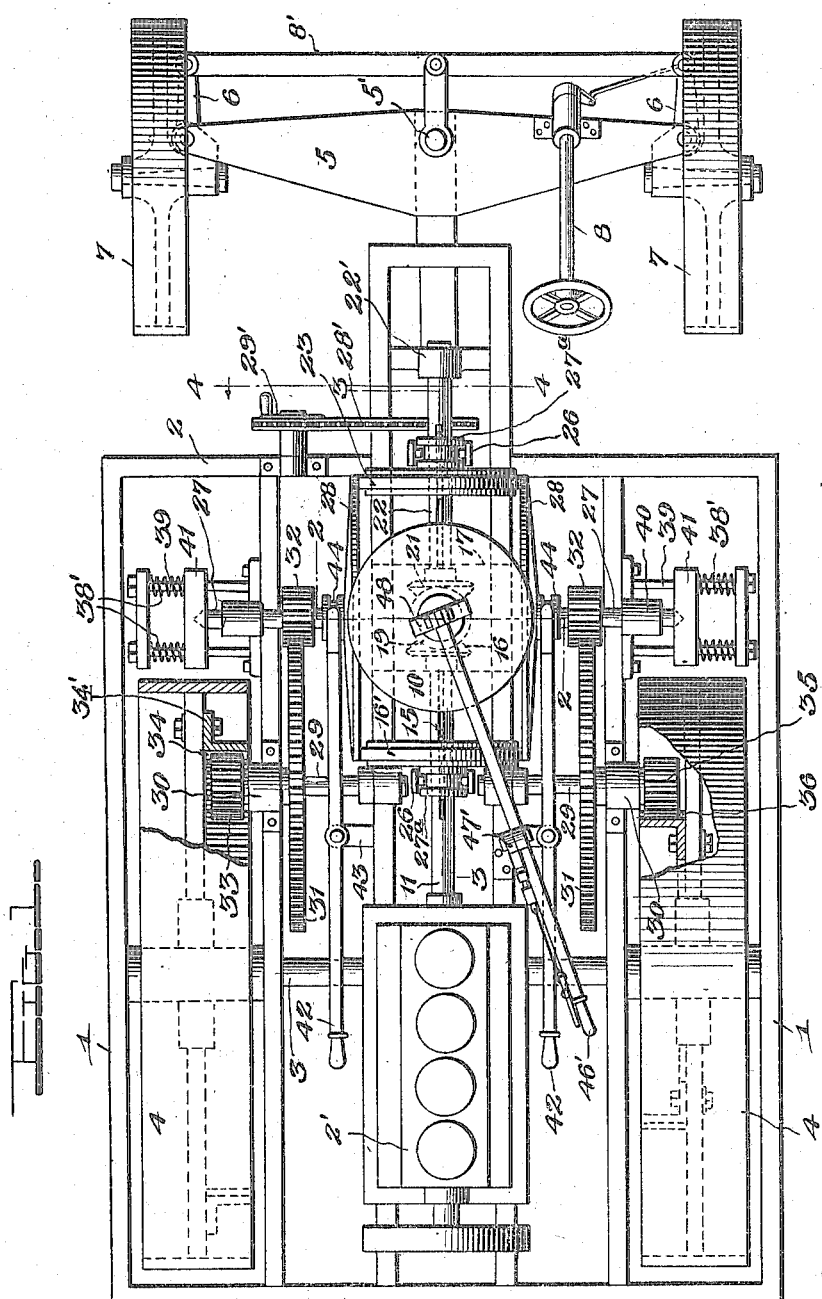
Witness
Chas. L. Grieshaver.
Inventor
T. W. Graham,
By Macomber
Attorneys

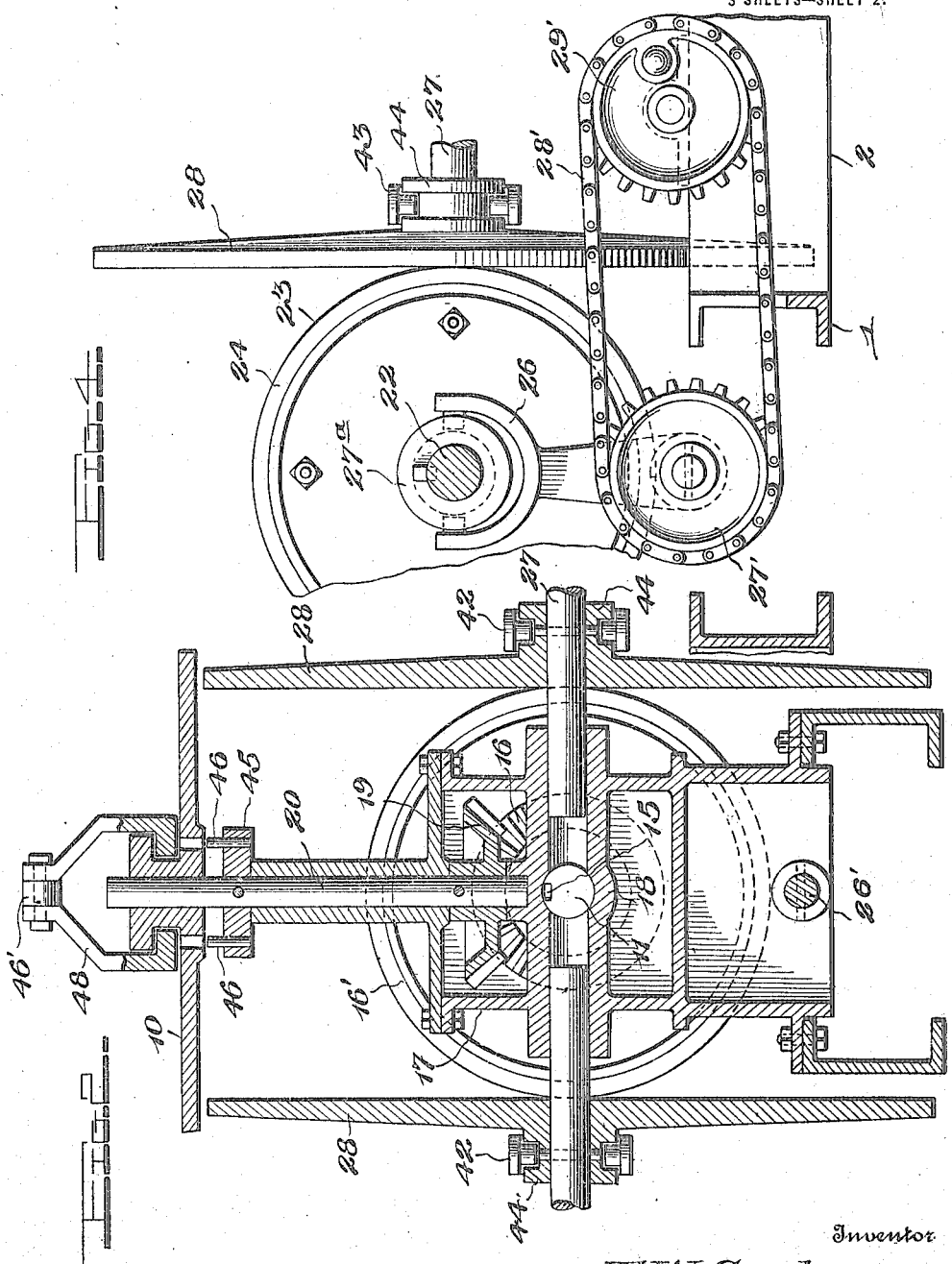

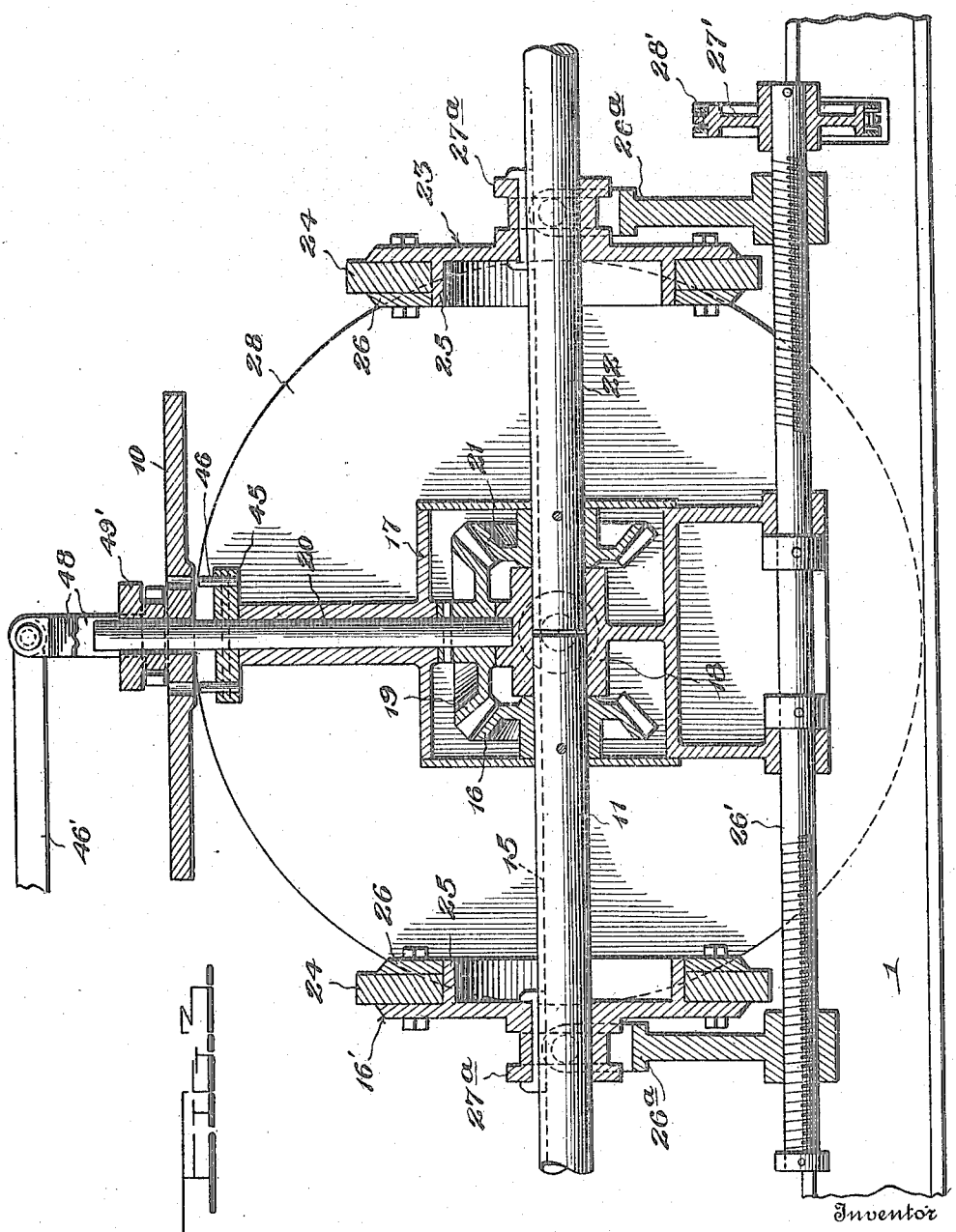

UNITED STATES PATENT OFFICE.

THOMAS W. GRAHAM, OF GRAHAM, COLORADO.

FRICTION-DRIVE.

1,271,158.  Specification of Letters Patent.  Patented July 2, 1918.

Application filed August 7, 1916. Serial No. 113,528.

*To all whom it may concern:*

Be it known that I, THOMAS W. GRAHAM, citizen of the United States, residing at Graham, in the county of Weld and State of Colorado, have invented certain new and useful Improvements in Friction-Drives, of which the following is a specification, reference being had therein to the accompanying drawing.

The invention relates to improvements in a variable speed transmission capable of use in unlimited fields, although particularly applicable for driving farm tractors or other heavy motor vehicles.

It is an object of the invention to provide a mechanism consisting of a power shaft having friction drive wheels thereon for rotating driven power transmitting disks arranged on each side of the driving wheels and coacting therewith at variable predetermined speeds in a forward direction, in combination with a normally inoperative reversing drive wheel rotated by the power shaft when placed in operative relation with the driven disks to drive said transmitting disks in a reversed direction.

More specifically the invention embraces a friction transmission in which the driving wheels rotated by the power shaft are revolved in opposite directions, the peripheral portions of these wheels contacting with the smooth faces of the driven disks at opposite sides of the axis of each disk, thus greatly increasing the driving power of the disks by providing a multiple friction driving connection between said disks and the power shaft and adding materially in many ways to the efficiency of the transmission. With this arrangement of the driving wheels the strain placed upon the driven disks is entirely equalized due to the fact that the driving wheels rotated in opposite directions exert an equal pressure on opposite sides of the disks so that these disks have no tendency to shift laterally out of their normal positions eliminating a great amount of friction upon the shafts supporting the disks mounted in suitable bearings, which has heretofore been a serious objection of the older devices where a single driving wheel is used and the driving strain is all placed upon one side of the driven disks. While it is preferable to provide driven disks on each side of the driving wheels it will of course be understood that good results can be obtained with the use of but a single power transmitting disk. To permit the direction of rotation of the driven disks to be reversed these disks are shiftable so that they may be moved laterally from engagement with the peripheral portions of the driving wheels to allow the reversing wheel mounted upon a reversing shaft geared with the power shaft and normally occupying an inoperative position, to fall between the disks, and when in this position to rotate the same in a reverse direction, it being understood that when the reversing wheel is in engagement with the faces of the driven disks the same then is in driving relation with the drive shaft.

With the foregoing and other objects in view as will appear as the description proceeds the invention is embodied in the combination and arrangement of parts as will be hereinafter more fully described, it being understood various changes may be made without departing from the spirit of the invention.

In the drawings Figure 1 is a plan view of the tractor.

Fig. 2 is a detail view partly in section of the driving and reversing mechanism; and, Figs. 3—4 are detail views of the different parts of the device.

Referring now more particularly to the drawings wherein like reference characters indicate corresponding parts, the numeral 1 designates the frame of the vehicle, which for the purpose of illustration is a farming tractor having the usual spaced beams 2 extending thereacross at various points to provide supporting means for the different elements of the transmission. At the rear end of the frame is mounted the stationary axle 3 upon which are loosely mounted the traction wheels 4 of any conventional type while the forward portion of the frame is pivotally connected to the front axle 5 and has at each end steering knuckles 6 upon which the steering wheels 7 are rotatably mounted. The steering wheels 7 are shifted by any approved type of hand operated steering mechanism preferably including the cross bar 8' connected with the outer ends of the steering knuckle which cross bar is in turn operatively associated with the hand steering wheel 8. The pivotal connection between the axle 5 and the forward portion of the frame is preferably by means of a longitudinally extending pivot shaft projecting forwardly from the front portion of the frame and engaging a bearing that extends through the front axle.

Mounted upon the framework of the vehicle is a motor 2' preferably of the gasoline type having a driving connection with the power shaft 11 extending forwardly therefrom. The shaft 11 is provided with a relatively long groove 15 therein near one end and carries a friction driving wheel 16' that is slidably mounted thereon, this wheel rotating with the shaft at all times due to the spline connection therewith, but shiftable longitudinally by a mechanism to be hereinafter described. The shaft 11 near its end carries a beveled gear 16 disposed within a metallic housing or gear casing 17 supported by the beams of the frame for receiving a suitable supply of lubricating oil to thoroughly lubricate the intermeshing gears therein to be later described. The housing 17 has a bearing 18 therein receiving the end of the shaft 11 and forming a support therefor. The gear 16 carried by the shaft 11 meshes with a beveled gear 19 carried by a vertically extending shaft 20 passing through the gear casing and supported by the bearing 18 within the casing heretofore described. The gear 19 carried by this shaft in turn meshes with the gear 21 rigidly fitted to the auxiliary driving shaft 22 entering the opposite side of the casing 17 and having its end seated in a portion of the bearing 18, it being understood that this bearing is relatively wide so as to provide an ample support for the free ends of the shafts 11 and 22 carrying the beveled gears. The shaft 22 is rotated upon the actuation of the power shaft 11 due to the intermeshing gear but it will of course be apparent that this shaft rotates in a direction opposite to the rotation of the shaft 11. Any suitable means may be provided for supporting the free end of the shaft 22, but I preferably provide bearings 22' arranged near the forward end of the frame upon one of the cross bars to receive the end of the shaft. A drive wheel 23 is mounted upon the shaft 22 and rotatable therewith, but slidable longitudinally upon the shaft due to a spline connection therewith, and as the mounting of this wheel is exactly the same as that of the driving wheel 16' a detailed description thereof will not be given. The drive wheels 16' and 23 preferably carry suitable peripheral rings 24 resting against a circumferential flange 25 extending around each ring and secured in position by the collars 26.

Journaled upon the cross beams 2 of the frame are the driven shafts 27 carrying spaced friction disks 28 having smooth faces, these disks being rigidly mounted upon the shafts so as to rotate the shafts when the disks are in driving connection with the drive wheels. The friction disks coöperate with the peripheral portions of the friction rings 24 carried by the drive wheels 16' and 23 and driven by the power shaft 11 so that when the driving wheels and disks are in frictional contact rotation is imparted through the driven shafts 27, the friction disks being normally maintained in contact with the driving wheels by means of the resilient members to be presently described. Any suitable gear connection between the driven shafts 27 and the rear wheels of the vehicle may be utilized but the same preferably consist of two independent shafts 29 located rearwardly of the shafts 27 and journaled at each end in bearings 30 mounted upon the vehicle. The shafts 29 each carry a gear wheel 31 meshing with the gears 32 rigidly fitted to the shafts 27 while the outer end of one shaft carries a gear wheel 33 meshing with the internal gear 34 mounted upon the flange 34' secured to its traction wheel by suitable fastening bolts. The other shaft 29 has mounted thereon a pinion 35 meshing with an external gear 36 secured to its traction wheel whereby both of the traction wheels are rotated in the same direction when the friction disks are in operation and revolving in opposite directions. The gear wheels 31 mounted upon the shafts 29 are of slightly different sizes so that the traction wheels operated by the friction disks will always be revolved at the same speed. While the preferred means for rotating the traction wheels is as above described it will be understood that instead of this construction any suitable drive may be utilized by which the propelling wheels are revolved in the same direction while the driving shafts therefor are moved in reversed directions. In order to vary the speed which the shafts 27 are to be driven and in turn control the speed of the vehicle, the friction drive wheels 16' and 23 are adjusted so that they may be moved radially across the faces of the driven disks 28, it being apparent that when the driving wheels 16' and 23 engage the outer portions of the driven disks the speed imparted to the driven shafts will be relatively slow while if the driving wheels engage the inner portions of the driven disks the vehicle will be propelled rapidly.

Any convenient means for shifting the driving disks together an equal distance toward and from each other so as to vary the speed of the vehicle may be utilized, but I preferably employ arms 26ª having yokes at one end engaging collars 27ª formed integral with the driving wheels 16' and 23 respectively. The lower portions of the arms 26ª depend below the driving wheels and have widened end portions provided with threaded openings engaging respectively right and left hand threaded portions of a rod 26' whereby the driving wheels can be moved synchronously toward and from each other over the faces of the friction disks to vary the points of contact therewith and the speed at which said friction disks are driven. The threaded operating rod 26' is provided near its forward end with a sprocket wheel 27' over which a sprocket chain 28' passes, this chain in turn extending around a hand operated sprocket wheel 29' supported by the cross beams of the vehicle to provide a suitable means for revolving the operating rod in any direction to shift the position of the driving wheels.

While this is the preferred means for shifting the drive wheels so as to vary the speed of the driven shafts it is of course obvious that any suitable mechanism capable of performing the desired function may be utilized without departing from the invention. The friction drive wheels by engaging opposite portions of the driven disks 28 exert an equal pressure on these disks and tend to hold the shafts 27 in their normal position, that is preventing any shifting of the shafts and thereby necessarily eliminating a great amount of friction between the shafts and their bearings and materially lengthening the life of the entire mechanism. It will also be apparent that by providing a multiple friction driving contact between the power shaft and the driven disks by the use of a pair of drive wheels the power imparted to the driven shaft is relatively great and a positive driving connection between the power shaft and the driven shafts 27 is thereby insured at all times. The friction disks 28 including their shafts 27 are shiftable laterally so that they may be placed into or out of engagement with the peripheral portions of the driving wheels 16' and 23 at any time upon the actuation of operating devices to be hereinafter described. The normal position of the disks 28 is in contact with the peripheral portions of the driving wheels, these disks being held in this position by the coil springs 38' mounted upon the outstanding rods 39 of the brackets 40 connected with the sides of the vehicle, the springs 38' bearing against the slidable blocks 41 each having a tapering recess therein receiving the tapered end of its shaft 27, and holding the shafts in the position disclosed in Fig. 1. The brackets 40 not only form a support for the outstanding rods 39, but also provide bearings for the end portions of the shiftable shafts 27 to firmly support these shafts and prevent any swinging movement thereof. To shift the disks 28 out of engagement with the driving wheels suitable levers 42 are provided, these levers being pivotally mounted upon supports 43 carried by the vehicle and having forked ends engaging the collars 44 loosely mounted upon the shafts 27 so that the shafts are permitted to rotate without in any way affecting the collars, but any lateral movement imparted to the collars is in turn transmitted to the shafts in view of the fact that the movement of the collars in one direction is prevented by the gear wheels 32 rigidly mounted upon the shafts 27 while movement of the collars in the other direction is prevented by the disks 28. The friction disks are preferably adjustable separately, but the levers 42 may be connected so that the disks are moved in unison. The levers 42 preferably extend to some portion of the vehicle where they are readily accessible so as to permit the gears to be shifted at any time at the will of the operator. When it is desired to reverse the rotation of the driven shafts 27 and correspondingly propel the vehicle rearwardly the levers 42 are shifted until the friction disks 28 become entirely disengaged from the driving wheels 16' and 23 at which time the reversing drive wheel 10 driven by the power shaft through the gear connection heretofore described and of a width greater than the width of the driving wheels 16' and 23 occupies an operative position between the driven disks 28. The reversing wheel 10 is mounted upon the shaft 20 projecting upwardly through the gear casing and in its normal position this wheel is out of contact with the faces of the driven disks and overlies the same. A clutch 45 is rigidly secured to the shaft 20 and is provided with upstanding coupling pins 46 adapted to enter sockets within the reversing wheel 10 when this wheel is lowered upon the shifting of the driven disks 28 from contacting with the driving wheels 16' and 23 so that a driving connection between the shaft 20 and the reversing wheel is provided to rotate the reversing wheel when the same has been lowered into an operative position. It will of course be understood that when the driven disks 28 are shifted that the reversing wheel 10 drops to a position to be coupled with the driving shaft 20 and any rotation on the part of the shaft will in turn be transmitted to the driven disks to rotate them in a reverse direction. The reversing wheel 10 is shifted into and out of engagement with the clutch 45 by a lever 46'. The lever 46', which is fulcrumed upon a support 47' has at one end a yoke 48 engaging the collar 49' of the reversing wheel. By raising and lowering the rear end of the lever 46' the reversing wheel may be moved into and out of engagement with the clutch.

By driving the propelling wheels 16' and 23 in reversed directions the power imparted to the driven disks 28 is very great due to the fact that each driving disk is propelled by two friction drive wheels insuring a positive driving connection between the driving and driven elements of the transmission and equalizing the strain placed upon the driven disks, that is to say that the strain upon each side of the driven disks is equal avoiding any tendency of the disks to shift laterally from their normal positions and thereby reducing the friction between the shafts 27 and their bearings which has heretofore been a serious objection in transmissions of this character where a single driving wheel engaging only one side of the driven disks is used.

Having thus described the various parts of the device the operation may be briefly stated as follows:

When it is desired to propel the vehicle forwardly at a relatively slow rate the wheels 16' and 23 are moved apart upon the actuation of the right and left hand threaded rod cooperating with the arms 26ª so that the peripheral portions of these wheels engage the driven disks 28 near their edges, and power is then imparted to the driven disks upon the rotation of the power shaft 11, which through the intermediate gear connection between the driven disks 28 and the rear wheels of the vehicle propel the tractor forwardly at a slow rate. If, however, it is desired to propel the vehicle rapidly the wheels 16' and 23 are moved together by the mechanism heretofore described so that these wheels engage the faces of the driven disks near the axis of each disk whereby rotation of the power shaft will correspondingly propel the driven disks very rapidly which in turn drives the vehicle forwardly at a rapid rate.

To move the vehicle rearwardly the friction disks 28 are shifted laterally by the actuation of the levers 42 so as to become completely disengaged from the driving wheels 16' and 23, and when these disks are a sufficient distance apart the reversing drive wheel 10 normally located above said disks may be moved into position and its peripheral portion engaged by the faces of the disks. The same are driven by the reversing shaft 20 having a gear connection with the power shaft 11. It will of course be understood that when the reversing wheel 10 drops between the driven disks 28 this wheel is coupled to the reversing shaft 20 by the clutch 45 rigidly connected with the shaft and having upstanding pins entering the sockets in the reversing wheel.

Having thus described the invention what I claim is:—

1. In a power transmission, the combination with a power shaft, of a pair of oppositely disposed friction drive wheels rotated in opposite directions by said power shaft, and a pair of friction disks disposed one at each side of the friction drive wheels, both of said friction disks being adapted to contact with and be driven at the same time by both of the driving friction wheels, the friction disks engaging the friction driving wheels at opposite sides of their axes of rotation.

2. In a power transmission, the combination with a power shaft, of a pair of oppositely disposed friction drive wheels rotated in opposite directions by said power shaft, a pair of friction disks disposed one at each side of the friction drive wheels, both of said friction disks being adapted to contact with and be driven at the same time by both of the driving friction wheels, the friction disks engaging the friction driving wheels at opposite sides of their axes of rotation, said drive wheels being supported for movement toward and from each other over the faces of the friction disks to vary the points of contact therewith and the speed of rotation of the friction disks, and means for synchroneously shifting the drive wheels toward and from each other.

3. In a power transmission, the combination with a power shaft, of a pair of oppositely disposed friction drive wheels rotated in opposite directions by said power shaft, a pair of friction disks disposed one at each side of the friction drive wheels, both of said friction disks being adapted to contact with and be driven at the same time by both of the friction drive wheels, the friction disks engaging the friction drive wheels at opposite sides of their axes of rotation, said friction disks being supported for movement into and out of engagement with the driving wheels, and means for yieldingly maintaining the friction disks in engagement with the driving wheels.

4. In a power transmission, the combination with a power shaft, of a pair of oppositely disposed friction drive wheels rotated in opposite directions by said power shaft, a pair of friction disks disposed one at each side of the friction drive wheels, both of said friction disks being adapted to contact with and be driven at the same time by both of the driving friction wheels, the friction disks engaging the driving wheels at opposite sides of their axes of rotation, said friction disks being supported for movement into and out of engagement with the friction driving wheels, means for yieldably maintaining the driving disks in contact with the friction wheels, said driving wheels being supported for movement toward and from each other over the faces of the friction disks to vary the points of contact therewith, and means for synchroneously shifting the driving wheels toward and from each other.

5. In a power transmission, the combination with a power shaft, of a friction drive wheel rotated thereby, a driven member movable into and out of engagement with said drive wheels and adapted to be driven in one direction thereby, a reversing drive wheel rotated by said power shaft and movable into and out of engagement with said driven member to rotate the same in a reverse direction, means for shifting the driven member out of driving relation with the forward drive wheel, and means for shifting the reversing drive wheel into and out of engagement with said driven member.

6. In a power transmission, the combination with a power shaft, of a pair of oppositely disposed friction drive wheels rotated in opposite directions by said power shaft, a pair of friction disks disposed one at each side of the friction drive wheels, both of said friction disks being adapted to contact with and be driven at the same time by both of the driving friction wheels, the friction disks engaging the friction drive wheels at opposite sides of their axes of rotation, said friction disks being movable into and out of engagement with the drive wheels, means for shifting the friction disks into and out of engagement with the drive wheels, a reversing drive wheel movable into and out of engagement with the friction disks and operatively connected with the power shaft, and means for shifting said reversing drive wheel into and out of engagement with the friction disks.

7. In a power transmission, the combination with a power shaft of a pair of oppositely disposed friction drive wheels rotated in opposite directions by said power shaft, a pair of friction disks disposed one at each side of the friction drive wheels, both of said friction disks being adapted to contact with and be driven at the same time by both of the driving wheels, the friction disks engaging the drive wheels at opposite sides of their axes of rotation, said friction disks being movable into and out of engagement with the drive wheels, means for shifting the friction disks into and out of engagement with the drive wheels, a reversing drive wheel operatively connected with the power shaft and movable into and out of engagement with the friction disks, said reversing wheel being of greater diameter than the diameter of each of the pair of drive wheels, and means for shifting the reversing drive wheel into and out of engagement with the friction disks.

8. In a power transmission, the combination with a power shaft, of a pair of oppositely disposed friction drive wheels rotated in opposite directions by the power shaft, a pair of friction disks disposed one at each side of the friction drive wheels, both of the friction disks being adapted to contact with and be driven at the same time by both of the driving friction wheels, the friction disks engaging the friction drive wheels at opposite sides of their axes of rotation, said friction disks being movable into and out of engagement with the drive wheels, means for shifting the friction disks into and out of engagement with the drive wheels, yieldable means acting to normally maintain the friction disks in engagement with the drive wheels, a reversing drive wheel operatively connected with the power shaft and movable into and out of engagement with the friction disks between the same, said reversing drive wheels being of greater diameter than the diameter of each of the pair of drive wheels, and means for shifting the reversing disk into and out of engagement with the friction disks.

9. In a power transmission the combination with a power shaft, of a friction drive wheel rotated thereby, a driven member movable into and out of engagement with said drive wheel and adapted to be rotated in a forward direction thereby, a reversing shaft driven by the power shaft, a reversing wheel slidable on said shaft into and out of engagement with said driven member, means for shifting the driven member into and out of engagement with the first mentioned drive wheel, and means for shifting the reversing wheel into and out of engagement with the driven member.

10. In a power transmission, the combination with a power shaft, of a friction drive wheel rotated thereby, of a driven member movable into and out of engagement with the drive wheel and adapted to be driven in a forward direction thereby, a reversing shaft extending at right angles to the power shaft and operatively connected thereto, a reversing wheel slidable on said shaft into and out of engagement with the driven member, a clutch part on said reversing shaft and a coöperating clutch part on the reversing wheel adapted to be operatively engaged to connect the shaft and wheel when said reversing wheel is moved into engagement with the driven member, and means for shifting the reversing drive wheel into and out of engagement with the driven member.

11. In a power transmission, the combination with a power shaft, a friction drive wheel rotated thereby, a pinion on the power shaft, an auxiliary drive shaft having a driving wheel thereon and provided with a pinion, a pinion interposed between said first mentioned pinions and meshing therewith whereby the driving wheels are rotated in reverse directions, a friction disk adapted to be engaged by the said driving wheels at opposite sides of its axes of rotation, said driven disk being movable into and out of engagement with said driving wheels, means for shifting the friction disk into and out of operative engagement with the driving wheels, a reversing shaft connected with said intermediate pinion, a reversing drive wheel slidable on said reversing shaft into and out of engagement with the friction disk, and means for shifting the reversing drive wheel into and out of engagement with said friction disk.

12. In a power transmission, the combination with a power shaft, a friction drive wheel rotated thereby, an auxiliary shaft, a driving wheel carried by said auxiliary shaft, a gear wheel on each of said shafts, a gear interposed between said gear wheels and meshing therewith, a reversing shaft carried by said last mentioned gear, a pair of driven disks coöperating with said driving wheels and rotated thereby, a reversing drive wheel mounted on said reversing shaft and normally occupying an inoperative position, means for shifting the driven disks out of engagement with the drive wheels, said reversing wheel being movable into and out of engagement with the driven disks, and means for shifting the reversing wheel into and out of engagement with said driven disks.

13. In a power transmission, the combination with a power shaft, a friction drive wheel rotated thereby, an auxiliary drive shaft adjacent said power shaft, a drive wheel on said auxiliary shaft, a gear connection between the power shaft and auxiliary shaft whereby said shafts are rotated in reverse directions, a pair of friction driven disks disposed on each side of the driving wheels and in frictional contact therewith whereby rotation is imparted to said disks, substantially as described.

14. In a power transmission, the combination with a power shaft, a friction drive wheel rotated thereby, an auxiliary drive shaft adjacent said power shaft, a drive wheel on said auxiliary shaft, a connection between the power shaft and auxiliary shaft whereby said shafts are rotated in reverse directions, a pair of friction driven disks disposed on each side of the driving wheels and both in frictional contact therewith whereby rotation is imparted to said disks, a reversing shaft driven by the power shaft, a friction reversing wheel mounted on said reversing shaft and normally occupying an inoperative position, means for shifting the driven disks out of engagement with the drive wheels to permit the reversing wheel to contact with said disks and occupy its operative position to rotate the same in a reverse direction.

15. In a power transmission, the combination with a power shaft, of driving members rotated in opposite directions by said shaft, a driven member having a driving connection with said driving members and rotated thereby, a reversing drive wheel rotated by the power shaft, means for disconnecting the oppositely rotating drive members from the driven member to permit the reversing wheel to be placed in operative association with the driven member to rotate the same in a reverse direction.

In testimony whereof I hereunto affix my signature in the presence of two witnesses.

THOMAS W. GRAHAM.

Witnesses:
E. C. ABBEY, Jr.,
WILL DOUGLAS.

Copies of this patent may be obtained for five cents each, by addressing the "Commissioner of Patents. Washington, D. C."